US012598106B2

(12) United States Patent
Vasseur et al.

(10) Patent No.: US 12,598,106 B2
(45) Date of Patent: Apr. 7, 2026

(54) POLICY MANAGEMENT AND ENFORCEMENT IN A GREEN ELASTIC NETWORK

(71) Applicant: Cisco Technology, Inc., San Jose, CA (US)

(72) Inventors: Jean-Philippe Vasseur, Combloux (FR); Grégory Mermoud, Venthône (CH); Pierre-André Savalle, Rueil-Malmaison (FR); Eduard Schornig, Haarlem (NL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/608,385

(22) Filed: Mar. 18, 2024

(65) Prior Publication Data

US 2025/0293929 A1    Sep. 18, 2025

(51) Int. Cl.
*H04L 41/0869* (2022.01)
*H04L 41/0894* (2022.01)

(52) U.S. Cl.
CPC ...... *H04L 41/0869* (2013.01); *H04L 41/0894* (2022.05)

(58) Field of Classification Search
None
See application file for complete search history.

(56) References Cited

U.S. PATENT DOCUMENTS

| | | | |
|---|---|---|---|
| 10,225,158 B1 * | 3/2019 | Lu | G06F 16/185 |
| 2019/0104182 A1 | 4/2019 | Elzur | |
| 2020/0177634 A1 * | 6/2020 | Hwang | H04L 63/1433 |
| 2020/0344127 A1 | 10/2020 | Rahman et al. | |
| 2021/0349657 A1 * | 11/2021 | Darji | G06F 3/0604 |
| 2022/0070716 A1 * | 3/2022 | Yan | H04W 28/0925 |
| 2023/0261945 A1 | 8/2023 | Wang et al. | |
| 2023/0335988 A1 | 10/2023 | Cella et al. | |
| 2024/0283825 A1 * | 8/2024 | Balmakhtar | G06Q 10/06393 |
| 2025/0055762 A1 * | 2/2025 | Walker | H04L 43/50 |

OTHER PUBLICATIONS

Addis et al. Energy management in communication networks: a journey through modeling and optimization glasses. arXiv: 1507. 02636. 43 pages. (Year: 2015).*
Verdecchia R., et al., "A Systematic Review of Green AI", arXiv:2301. 11047v3 [cs.AI], May 5, 2023, 16 Pages.
Yang J., et al., "AI Powered Green Cloud and Data Center", Researchgate, IEEE Access, Dec. 2018, pp. 1-8.

* cited by examiner

*Primary Examiner* — Jeffrey R Swearingen
(74) *Attorney, Agent, or Firm* — Merchant & Gould P.C.; Kenneth J. Heywood

(57) ABSTRACT
In one implementation, a device receives one or more constraints from a user interface regarding an acceptable level of performance of a computer network. The device forms, based on the one or more constraints, a policy to control performance of actions in the computer network to reduce its energy consumption. The device determines whether a particular action to reduce energy consumption by the computer network would violate the policy. The device causes performance of the particular action in the computer network, when doing so does not violate the policy.

20 Claims, 12 Drawing Sheets

310

SaaS PROVIDERS(S)
308

ISP 3
306d

ISP 2
306b

ISP 1
306a

MPLS
306c

REGIONAL
HUB
304

Int 1

Int 2

Int 3

110

REMOTE
SITE
302

600

1000

1005

Start

1010

Receive Constraint(s)

1015

Form Policy to Control Actions to Reduce Network Energy Consumption

1020

Determine Whether Action Violates Policy

1025

Cause Performance of Action

1030

End

POLICY MANAGEMENT AND ENFORCEMENT IN A GREEN ELASTIC NETWORK

TECHNICAL FIELD

The present disclosure relates generally to computer networks, and, more particularly, to policy management and enforcement in a green elastic network.

BACKGROUND

In recent years, the global landscape has been marked by an escalating demand for green initiatives, such as reducing energy consumption across various industries. This is due to factors such as climate change and an overall push towards operational efficiency. However, these efforts also come at a time when networking technologies and their associated resource demands are experiencing unprecedented growth, largely fueled by the digital transformation of economies, the proliferation of cloud services, and the roll out of next-generation networks, such as 5G cellular networks.

Traditionally, networks have attempted to meet their increasing user demands, while still meeting their service level agreements (SLAs), by overprovisioning. Under this strategy, the network capacity is significantly expanded in anticipation of future growth and/or bursts of demand. While doing so simplifies network design and operation, it also results in inefficiencies from a green perspective, as overprovisioning also means that the resources of a network will remain idle for extended periods of time, thereby consuming more energy than actually needed.

Even with the ability to elastically scale the network to conserve energy, policy enforcement remains challenging. Indeed, computer networks are complex systems and ensuring that the network provides acceptable performance when implementing an energy conserving action is difficult. For instance, simply powering down a certain networking device may conserve energy, but doing so could also cause its traffic to be sent over another link that, when combined with its existing traffic, overloads the bandwidth of the link and impacting users.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device receives one or more constraints from a user interface regarding an acceptable level of performance of a computer network. The device forms, based on the one or more constraints, a policy to control performance of actions in the computer network to reduce its energy consumption. The device determines whether a particular action to reduce energy consumption by the computer network would violate the policy. The device causes performance of the particular action in the computer network, when doing so does not violate the policy.

Other embodiments are described below and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
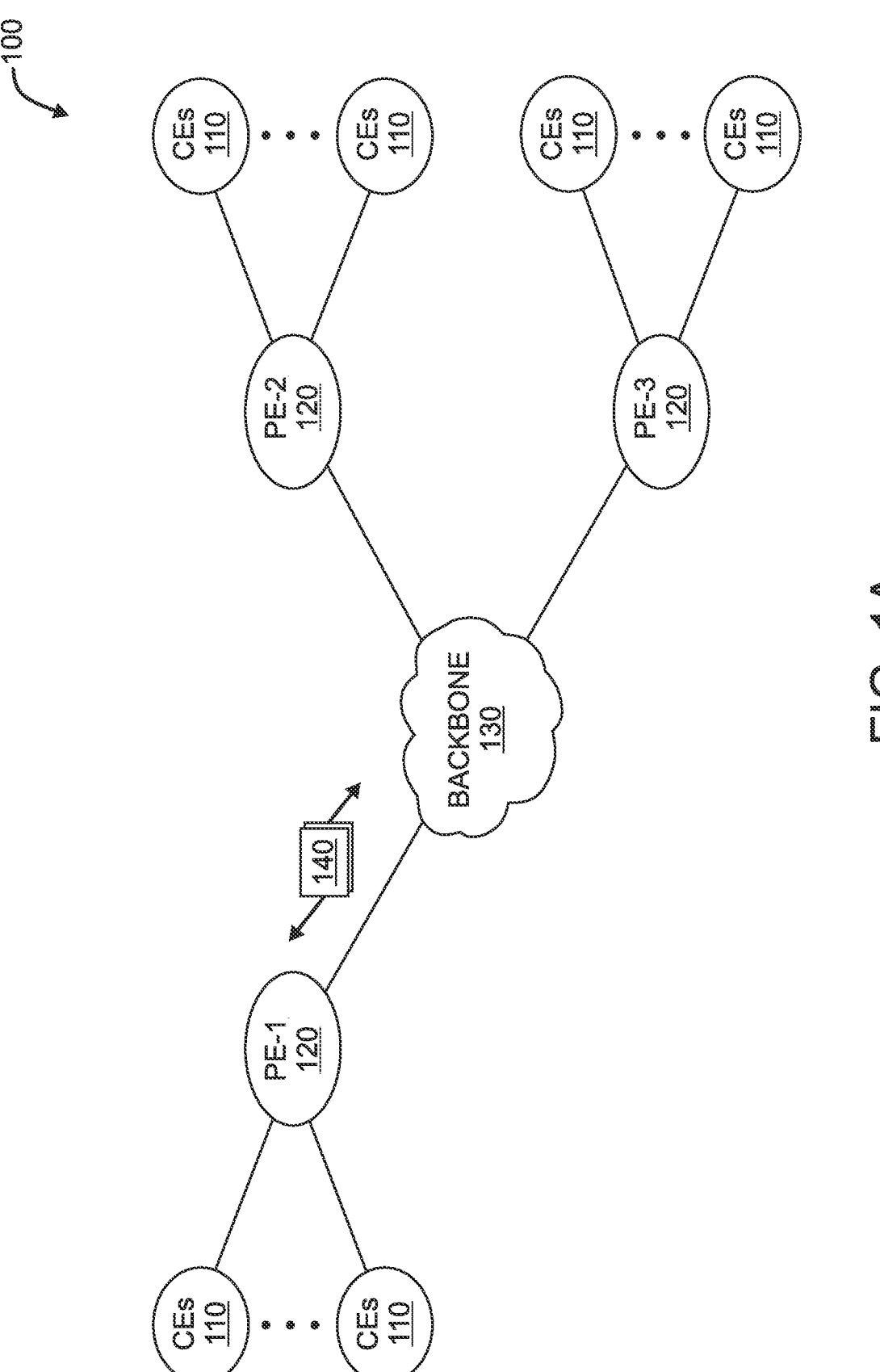
FIGS. 1A-1B illustrate an example communication network.

FIG. 1A is a schematic block diagram of an example computer network (e.g., network 100) illustratively comprising nodes/devices, such as a plurality of routers/devices interconnected by links or networks, as shown. For example, customer edge (CE) routers (e.g., router 110) may be interconnected with provider edge (PE) routers 120 (e.g., PE-1, PE-2, and PE-3) in order to communicate across a core network, such as an illustrative network backbone (e.g., network backbone 130). For example, router 110, router 120 may be interconnected by the public Internet, a multiprotocol label switching (MPLS) virtual private network (VPN), or the like. Data packets 140 (e.g., traffic/messages) may be exchanged among the nodes/devices of the computer network (e.g., network 100) over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router (e.g., router 110) shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement (SLA), whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router (e.g., router 110) connected to PE-2 and a second CE router (e.g., router 110) connected to PE-3.

Figure 1B:
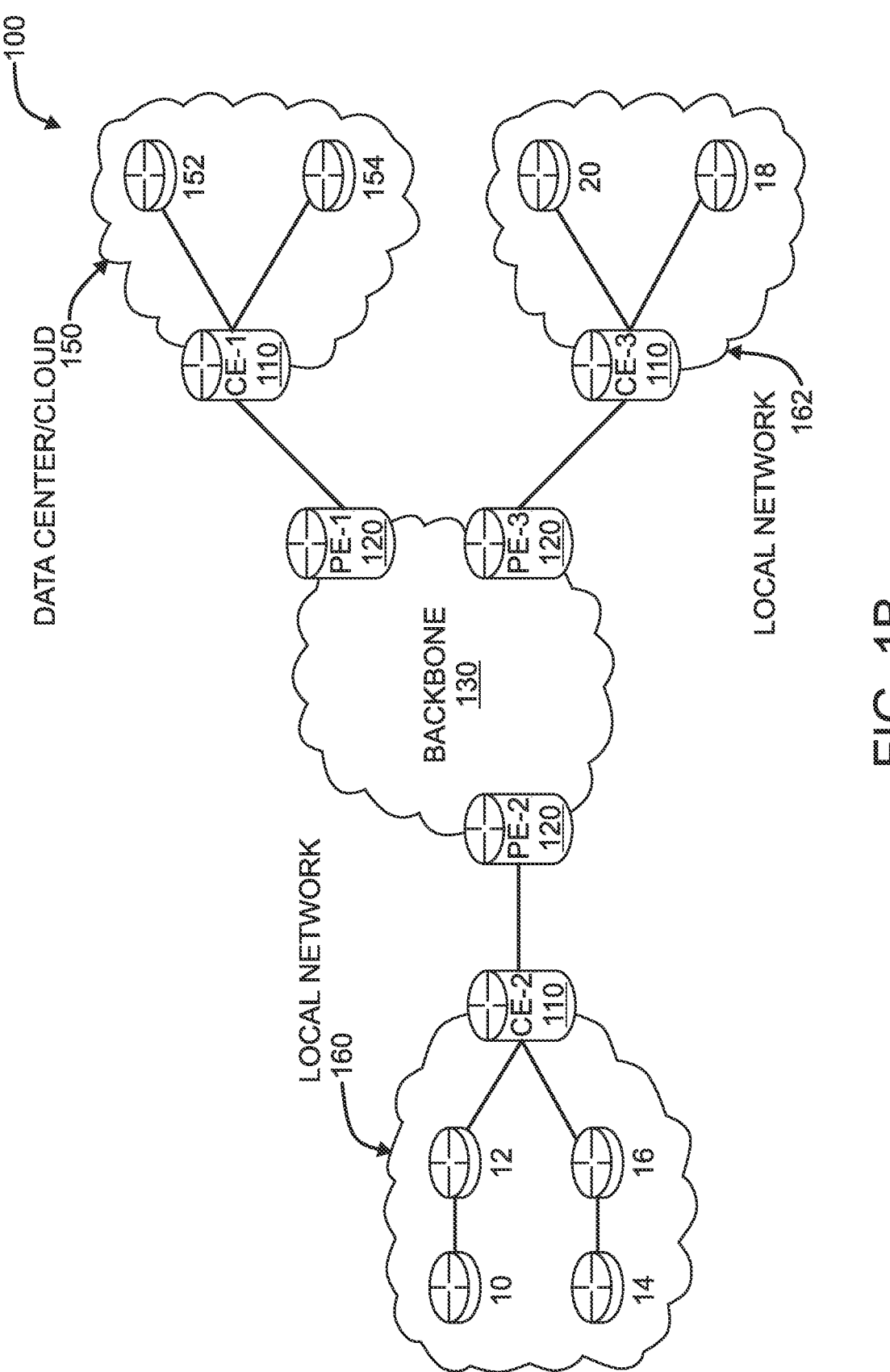

FIG. 1B illustrates an example of network 100 in greater detail, according to various implementations. As shown, network backbone 130 may provide connectivity between devices located in different geographical areas and/or different types of local networks. For example, network 100 may comprise local and/or branch networks that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in network backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
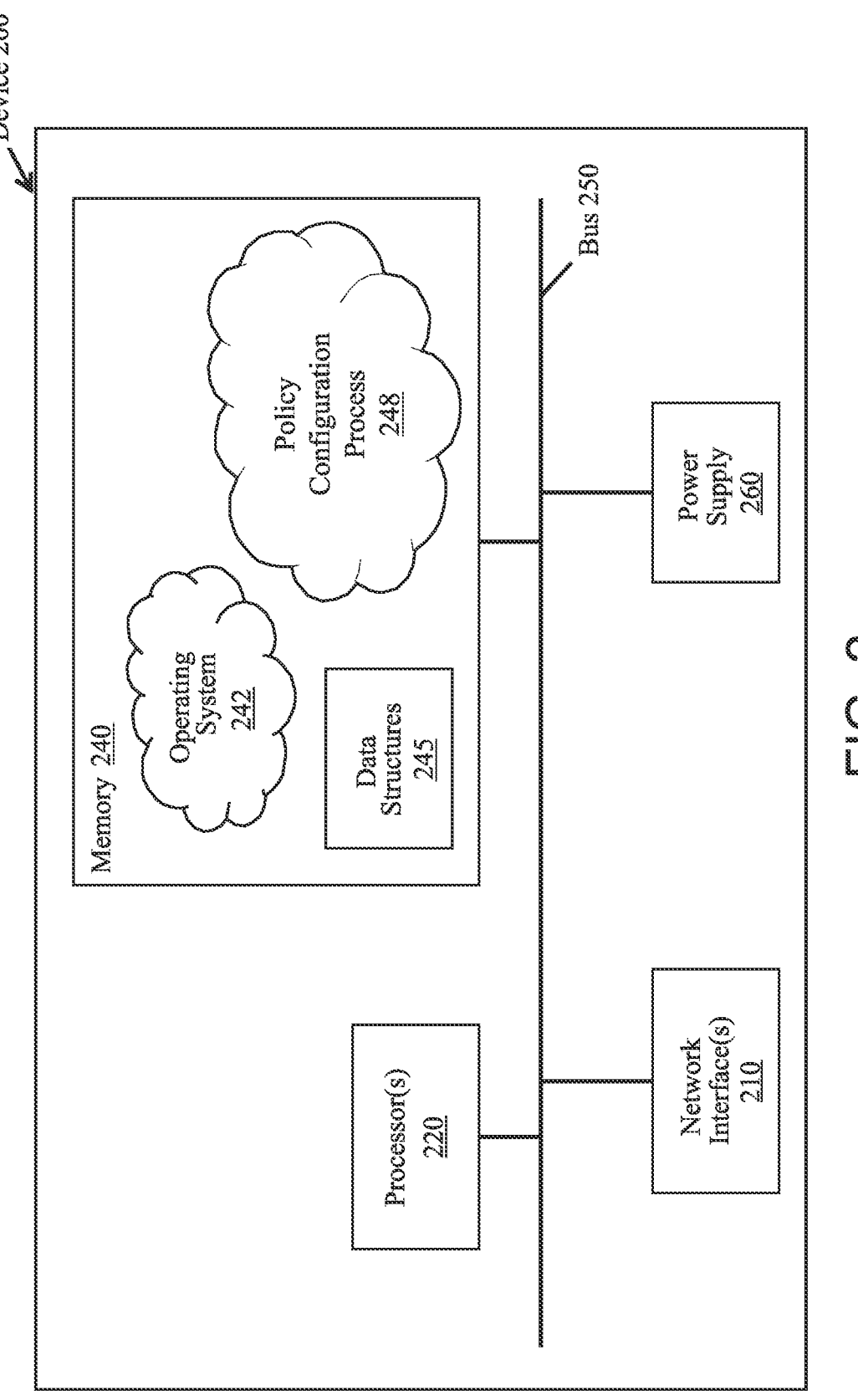
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers (e.g., router 120), CE routers (e.g., router 110), nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces (e.g., network interfaces 210), one or more processors (e.g., processor(s) 220), and a memory 240 interconnected by a system bus 250 and powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, network optimization process 248 may include computer executable instructions that, when executed by processor(s) 220, cause device 200 to perform the techniques described herein. To do so, in some implementations, network optimization process 248 may utilize machine learning. In general, machine learning is concerned with the design and the development of techniques that take as input empirical data (such as network statistics and performance indicators) and recognize complex patterns in these data.

In various implementations, network optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network optimization process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network optimization process 248 may use a generative model to generate synthetic network traffic based on existing user traffic to test how the network reacts. Example generative approaches can include, but are not limited to, generative adversarial networks (GANs), large language models (LLMs), other transformer models, and the like.

As noted above, in software defined WANs (SD-WANs), traffic between individual sites is sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Typically, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is often performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
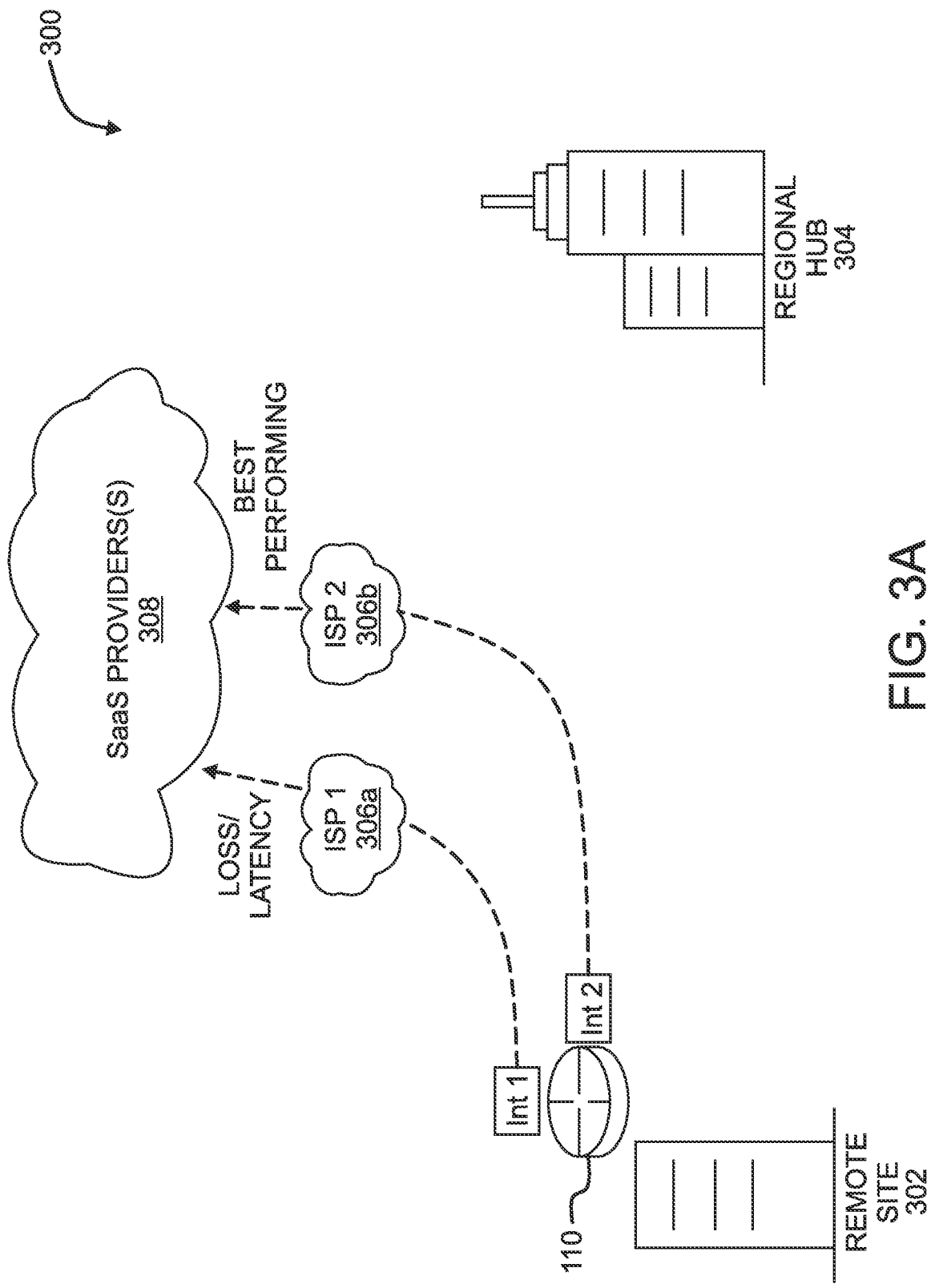
FIGS. 3A-3B illustrate example network deployments.
Figure 3B:
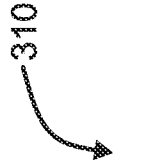

FIGS. 3A-3B illustrate example network deployments (e.g., network deployment 300, network deployment 310, respectively). As shown, a router 110 located at the edge of a remote site 302 may provide connectivity between a local area network (LAN) of the remote site 302 and one or more cloud-based, SaaS providers (e.g., provider(s) 308). For example, in the case of an SD-WAN, router 110 may provide connectivity to SaaS provider(s) (e.g., provider(s) 308) via tunnels across any number of networks 306. This allows clients located in the LAN of remote site 302 to access cloud applications (e.g., Office365™, Dropbox™, etc.) served by SaaS provider(s) (e.g., provider(s) 308).

As would be appreciated, SD-WANs allow for the use of a variety of different pathways between an edge device and a SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., network interfaces 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
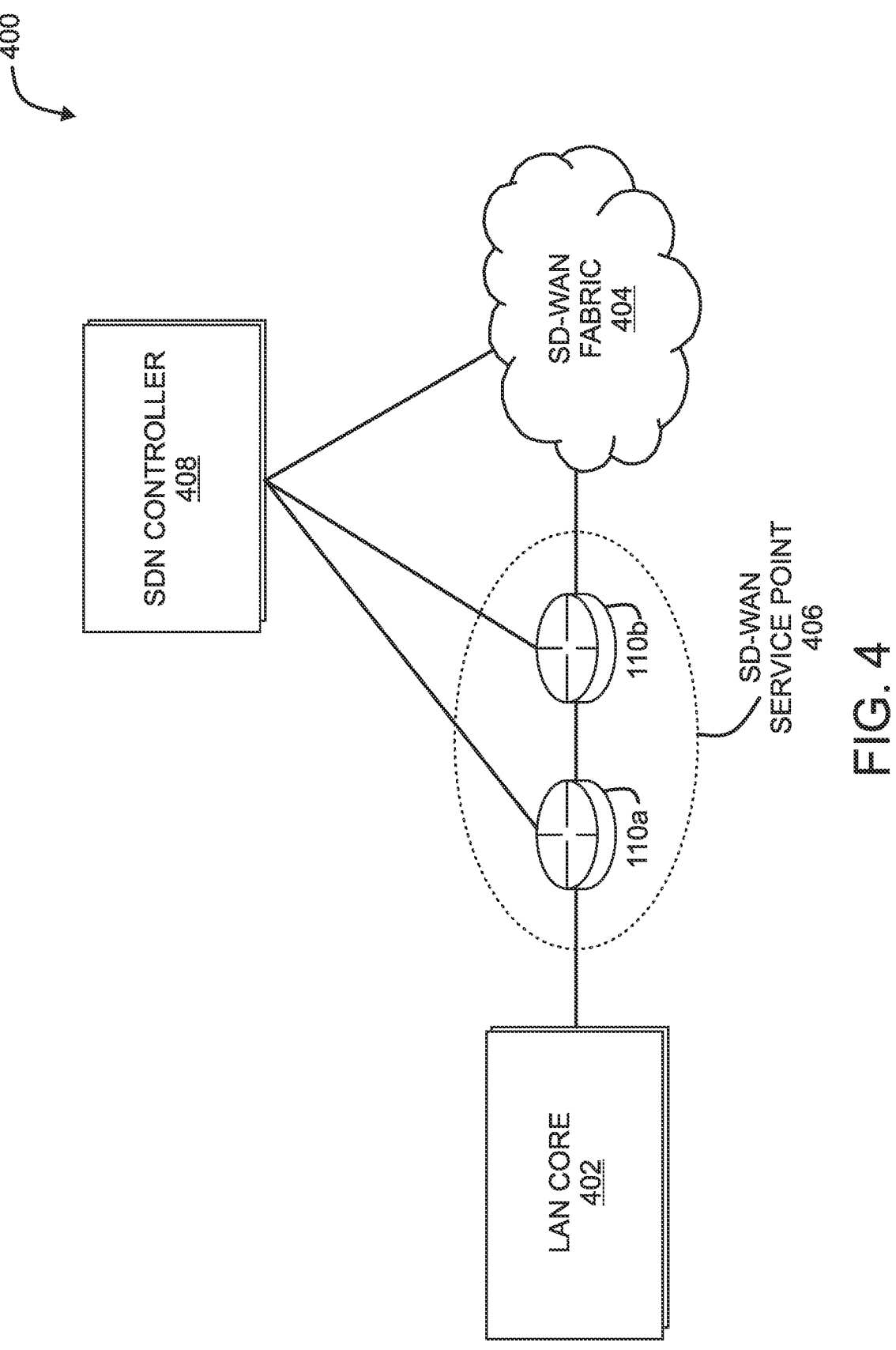
FIG. 4 illustrates an example of a software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging a SaaS model. Consequently, the number of applications that became network-centric has grown approximately exponentially with the raise of SaaS applications, such as Office365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of service provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, application aware routing generally refers to the ability to route traffic so as to satisfy the requirements of the application, as opposed to exclusively relying on the (constrained) shortest path to reach a destination IP address. Various attempts have been made to extend the notion of routing, constrained shortest path first (CSPF), link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application.

Figure 5:
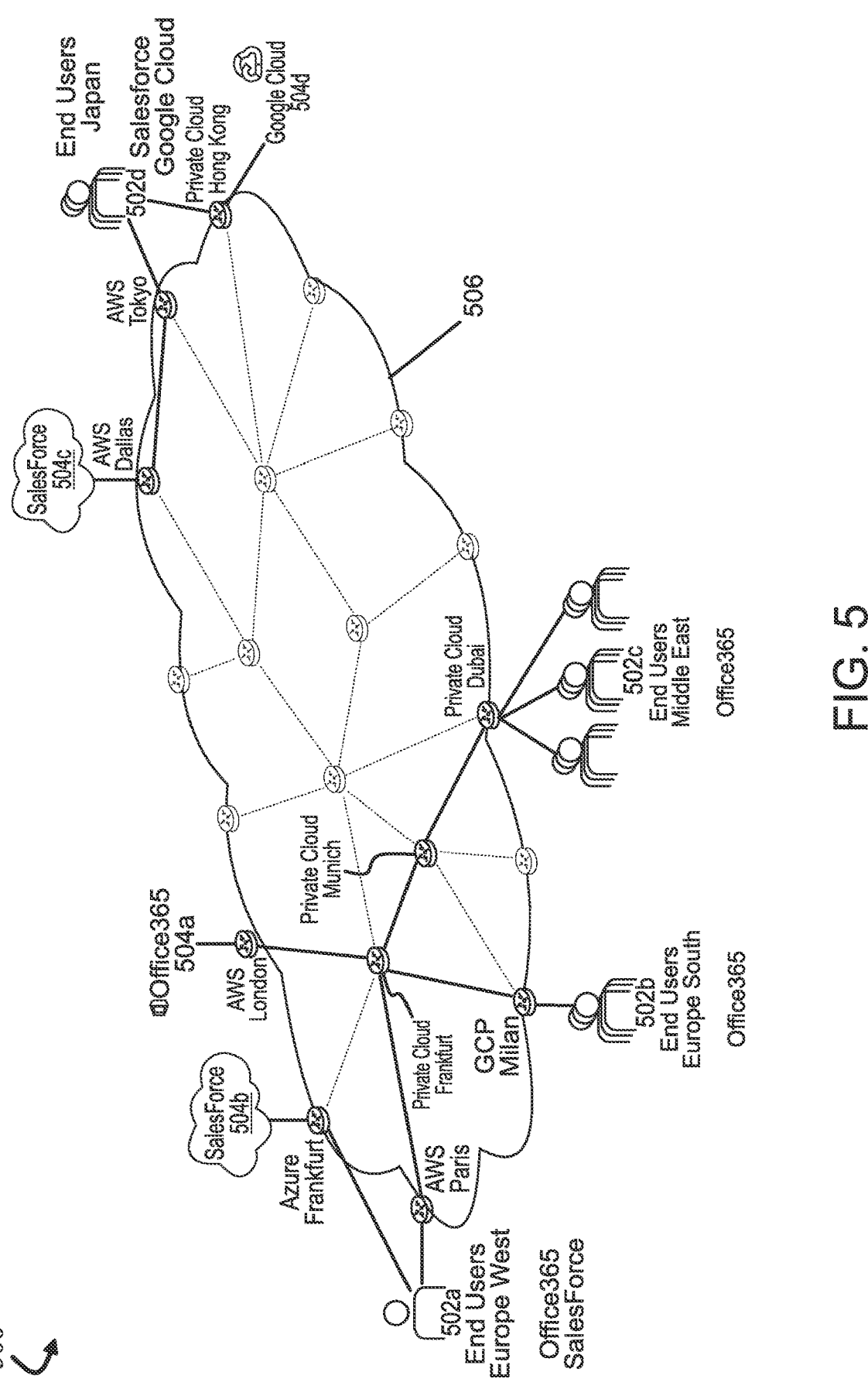
FIG. 5 illustrates an example of a cloud network architecture.

FIG. 5 illustrates an example of a cloud network architecture 500. The cloud network architecture 500 may be a geographically distributed system designed to facilitate communications and interactions among end users 502 (e.g., 502a-502d) and cloud-hosted applications 504 (e.g., 504a-504d) across various locations. Such applications may include a first application 504a (Office365), a second application 504b (e.g., a first instance of Salesforce), a third application 504c (e.g., a second instance of Salesforce), a fourth application 504d (e.g., Google Cloud), etc. Distributed across network 506 may be any number of end users 502 at different locations that access the various instances of the cloud-hosted applications 504. Communication between the end users 502 and the cloud-hosted applications 504, which may be hosted across multiple cloud platforms (e.g., Azure, AWS, Google Cloud, private cloud, etc.), may occur via data communication across network pathways between nodes of network 506.

As noted above, energy and other resource costs have been on the rise, significantly impacting both households and major industries. For instance, electricity prices in some regions have surged by twenty to thirty percent within a year. This increase has been attributed to various factors such as heightened demand and geopolitical issues affecting fuel supplies. Additionally, the energy consumption in key sectors like technology is noteworthy. Data centers, crucial for our digital world, consume about one to two percent of global energy, translating to hundreds of terawatts annually. This amount is only increasing. Furthermore, the telecom industry is also a significant energy consumer. For example, it's estimated that global telecoms use over sixty billion kilowatt-hours of energy per year, a figure that's growing with the expansion of networks like 5G.

The urgency for energy saving is accentuated by both economic and environmental needs. Decreasing energy usage is pivotal in combating climate change, as it reduces the demand for fossil fuels, thereby lessening greenhouse gas emissions. Simple measures like adopting energy-efficient appliances and mindful usage can have profound impacts. For large tech companies and data centers, energy-saving measures are even more crucial due to their high energy demands. The combined efforts of individuals and large enterprises in reducing energy usage can significantly contribute to environmental protection.

"Green IT" is being ushered to the forefront against this backdrop. This approach is exemplified by the practice of using information technology in a way that minimizes environmental impact, emphasizing resource efficiency. For instance, the adoption of energy-efficient servers and optimized data center layouts can markedly reduce energy consumption. In the telecom sector, innovations such as energy-efficient network technologies can substantially cut down power usage. The implementation of Green IT not only aids in environmental conservation but also offers economic benefits through reduced energy costs. By integrating energy-saving measures and Green IT practices, substantial progress can be realized in creating a sustainable and eco-friendly future, addressing both the escalating energy demands and the urgent need to protect our environment.

For example, traditional network designs have approached resource scaling through a traffic engineered network approach or an overprovisioned network approach. The traffic engineered network approach may include operating the network according to the principle that considering a given traffic demand and network capacity, an optimal traffic placement may be found to meet SLAs. This approach is sometimes applied in interior gateway protocol (IGP) traffic engineered (TE) technologies, multiprotocol label switching (MPLS) TE technologies, path computation element (PCE) technologies, etc. The pros of this approach include cost reduction (as compared to over-provisioning) and high SLA/SLO satisfaction. The cons of this approach are that it has high complexity and is inflexible to sudden demand changes.

The overprovisioned network approach may include operating the network according to the principle that network traffic demand can be monitored and the network capacity may be overprovisioned to meet current demands and potential demand fluctuations (e.g., increased demand). This approach is sometimes applied IP with limited IGP-based TE technologies, etc. The pros of this approach include its simplicity. The cons of this approach are that it cannot be sustained in terms of return on investment (ROI) (e.g., issues with over-the-top providers). That is, it is a very costly approach with respect to owning and operating idle capacity out of an abundance of caution.

To summarize, networks have been vastly differing in terms of design principles: some of them have adopted an "over-provisioning" strategy according to which lots of resources are provisioned thus allowing for more simple designs (e.g., no QoS, no complex TE, ease of troubleshooting, etc.). In contrast, other networks have been designed with limited and highly optimized resources, thus requiring the use of more complex technologies to optimize traffic, SLA, and so on. In all cases, current communication networks have traditionally been designed with an "always-on" approach, with network equipment continuously running at full speed/capabilities, resulting in a considerable amount of energy being drained, often unnecessarily in the context of actual demand. Overprovisioning of network equipment (e.g., deploying more, or bigger hardware) in expectation of usage growth down the line, can lead to additional energy wastage until such growth materializes.

However, for most networks, traffic demand is not constant and usually follows daily cyclical patterns with periods of highs and lows (e.g., see network traffic usage time series 600). In enterprise environments, the network is predominantly utilized during traditional 9:00 to 17:00 business hours, with little or no use outside this interval at most locations. A similar observation can be made in the context of Service Provider Networks, where peak network load is usually in the 17:00 to 22:00 before gradually slowing down over the night.

Figure 6:
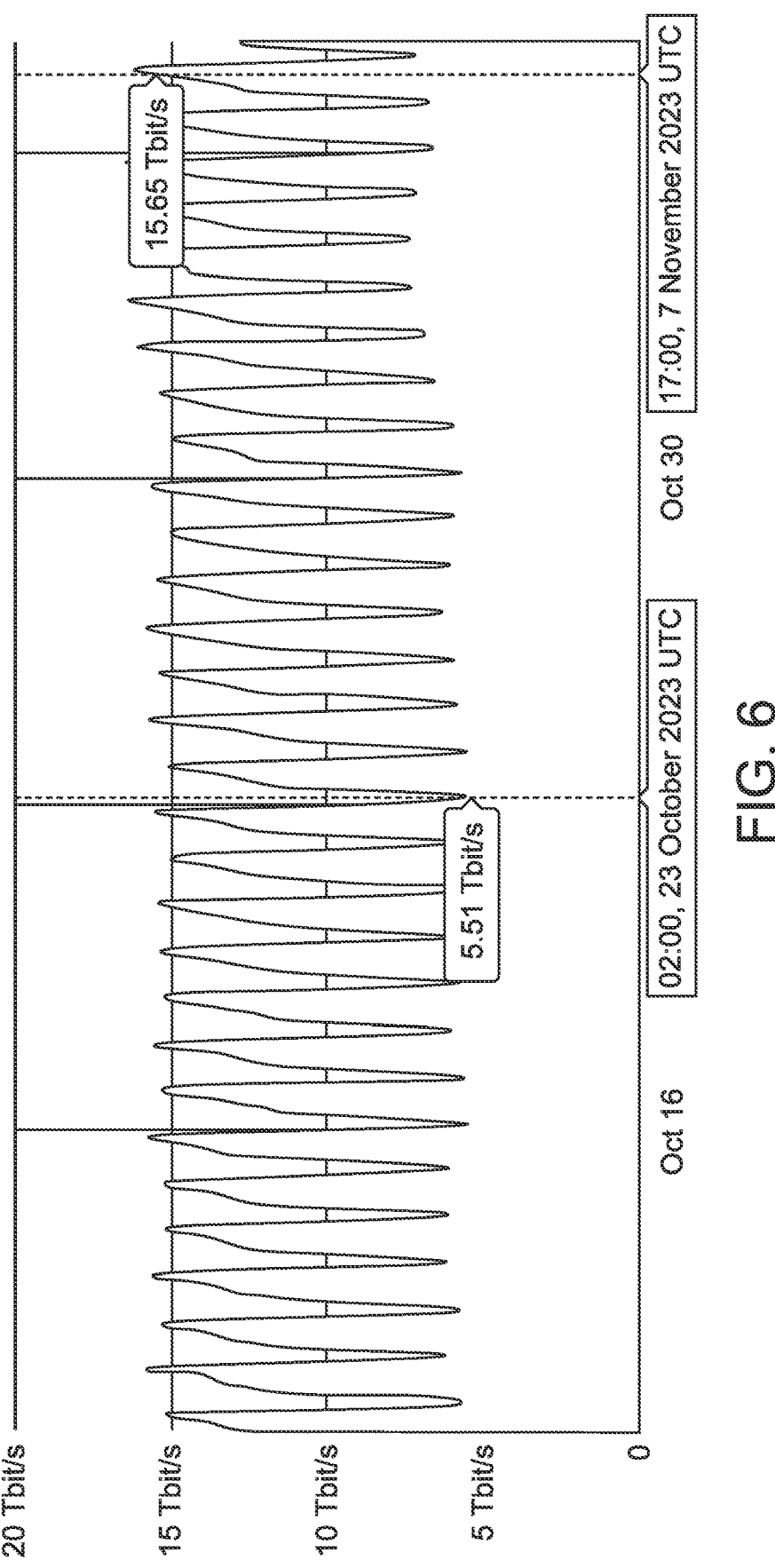
FIG. 6 illustrates an example of a network traffic usage time series.

For instance, FIG. 6 illustrates an example of a network traffic usage time series 600. As shown, network traffic usage time series 600 illustrates the fluctuation in network resource demands that cyclically occur over a period of time. In order for networks to accommodate this traffic in a manner that will satisfy SLA requirements, the network must be adequately provisioned with network resources (e.g., computational resources, communication resources, infrastructure, equipment, power, etc.) in a manner than can accommodate cyclical traffic bursts.

The network traffic usage time series 600 may be a DE-CIX Internet Exchange network traffic usage graph illustrating network traffic utilization over a thirty-day period (e.g., Oct. 9, 2023-Nov. 8, 2023). In network traffic usage time series 600, traffic usage cycles between lows of approximately six terabits per second and highs of approximately fifteen terabits per second over twenty-four-hour periods. As can be appreciated from network traffic usage time series 600, the network must be provisioned in order to handle the fifteen terabits per second load. However, the network resources in place to accommodate the fifteen terabits per second load are laying idle and are consequently underutilized when the network is experiencing the six terabits per load.

Facing resource consumption challenges and increasing environmental concerns, organizations of all sizes are now looking for ways to reduce the energy consumption of their communications networks. However, there are no existing mechanisms that can balance resource consumption/conservation with the necessity of SLA/QoE satisfaction.

——AI-Driven Elastic Network to Reduce Energy Consumption——

According to various embodiments, the techniques herein allow for the creation of AI-driven elastic networks that are able to reduce energy consumption, while still satisfying the various SLAs of the applications that they support. For simplicity, such a network is also referred to herein as a "GreenNetAI network." In some aspects, GreenNetAI networks may operate according to the principle that, considering a given traffic demand, the objective is to make the network elastic and reduce energy consumption, while preserving SLAs/QoE and avoiding traffic disruption. More specifically, the introduced GreenNetAI networks may be elastic networks capable of dynamically adapting their network architectures, configurations, equipment, etc. to meet traffic demand in a manner that reduces/minimizes resource consumption, while ensuring little to no traffic disruptions and that their SLAs are satisfied.

As described in greater detail below, a GreenNetAI network may operate by leveraging various mechanisms that can be used at the scale of a large enterprise network, to conserve resources, save energy, reduce costs, reduce greenhouse gas (GHG) emissions, increase operation efficiency, etc. while maintaining Quality of Experience (QoE), according to specific constraints and objectives. This approach operates on the wide range of levers and arbitrage opportunities available in networking. For example, in a given network traffic may still be able to flow through some other path with a worse but still acceptable SLA while some more expensive (e.g., from a resource consumption perspective) devices or paths are powered down. In some instances, these techniques main QoE by making use of digital twins, various models (e.g., for resource consumption), network state retrievals, and/or the monitoring of network QoE and SLA metrics in the form of positive/negative feedback.

Illustratively, the techniques described herein may be performed by hardware, software, and/or firmware, which may include computer executable instructions executed by the processor(s) 220 (or independent processor of network interfaces 210) to perform functions relating to the techniques described herein, such as in conjunction with network optimization process 248.

Figure 7:
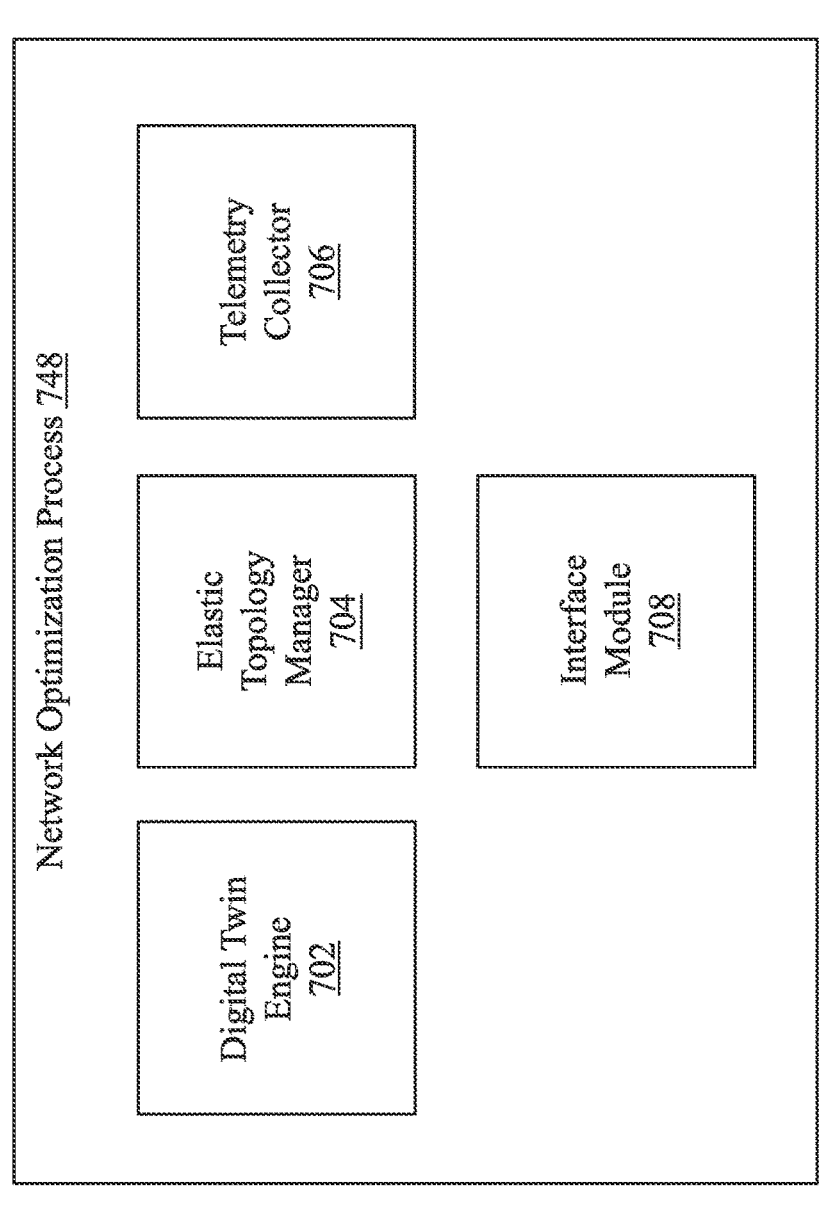
FIG. 7 illustrates an example architecture to implement an artificial intelligence (AI)-driven elastic network to reduce energy consumption.

Operationally, FIG. 7 illustrates an example architecture 700 for implementing a GreenAINet network, according to various implementations. At the core of architecture 700 is network optimization process 248, which may be executed by a controller for a network or another device in communication therewith. For instance, network optimization process 248 may be executed by a controller for a network (e.g., SDN controller of an SD-WAN network, a controller of a cloud network, etc.), a particular networking device in the network (e.g., a router, a firewall, etc.), a server, another device or service in communication therewith, or the like.

As shown, network optimization process 248 may include any or all of the following components: a digital twin engine 702, elastic topology manager 704, a quality of telemetry collector 706, and/or an interface module 708. As would be appreciated, the functionalities of these components may be combined or omitted, as desired. In addition, these components may be implemented on a singular device or in a distributed manner, in which case the combination of executing devices can be viewed as their own singular device for purposes of executing network optimization process 248.

Figure 8:
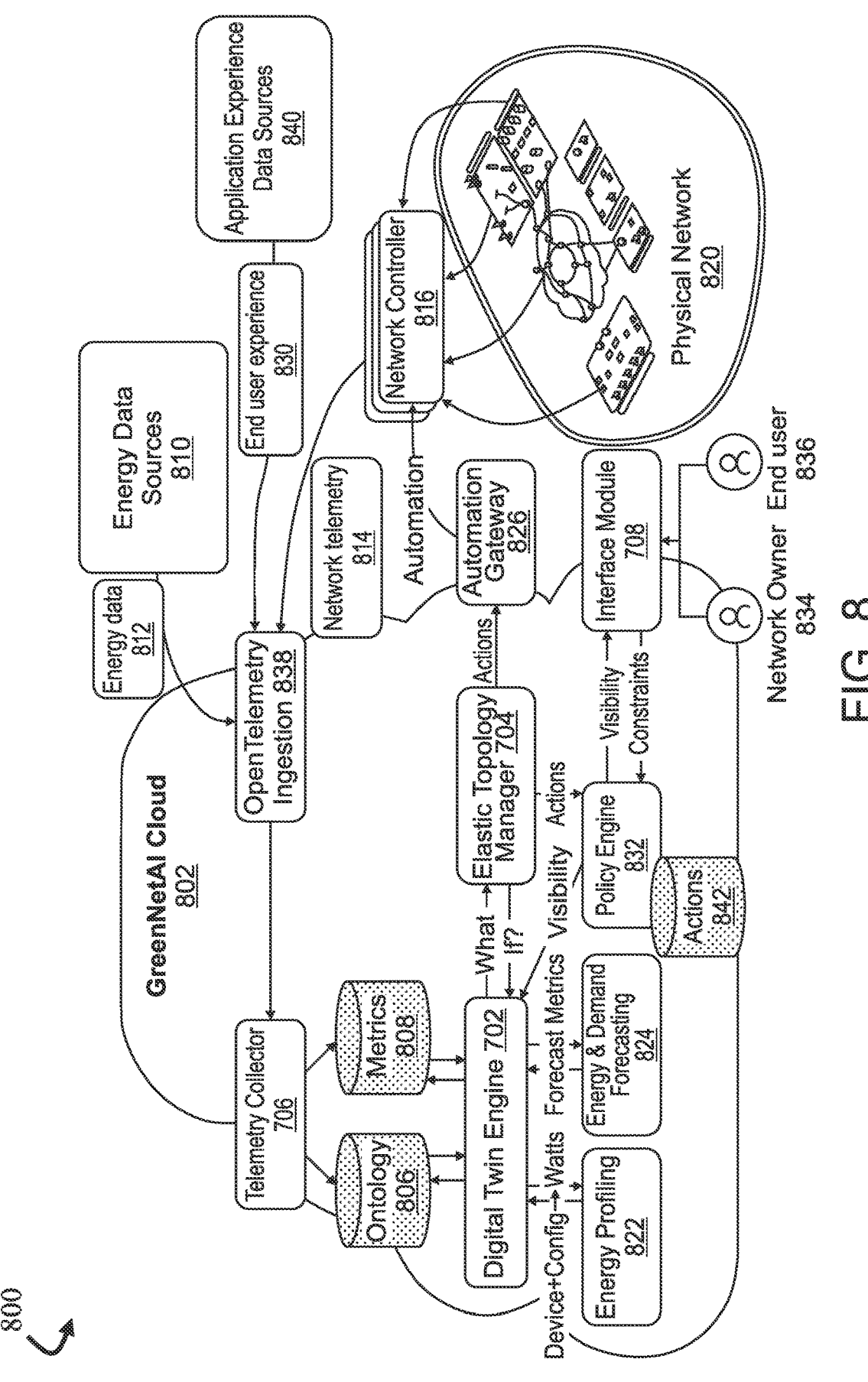
FIG. 8 illustrates an example of the interactions of the components of FIG. 7 in an AI-driven elastic network.

The interactions of the components of architecture 700 are shown in greater detail in FIG. 8 to implement a GreenNetAI cloud 802, in various embodiments. As shown in architecture 800 in FIG. 8, GreenNetAI cloud 802 may exist on top of a physical network 820 controlled by any number of network controllers 816 (e.g., SDN controller 408, etc.).

According to various embodiments, GreenNetAI cloud 802 may rely on a digital twin of physical network 820 to perform its energy-conscious optimizations. To this end, telemetry collector 706 may obtain various information from physical network 820, energy data sources 810, and/or application experience data sources 840, to form a digital twin of physical network 820. In some implementations, telemetry collector 706 may obtain any or all of this information via an OpenTelemetry-based ingestion mechanism 838. However, further implementations provide for telemetry collector 706 doing so by making API calls, accessing one or more data brokers, or the like, either on a pull or push basis.

More specifically, telemetry collector 706 may obtain network telemetry 814 from various entities associated with physical network 820, such as network controllers 816. For instance, network telemetry 814 may include information regarding the state of physical network 820 such as topology information, device information, configuration information, path metrics, routing information, direct energy consumption measurements, or any other information needed from physical network 820 to form a digital twin of physical network 820.

Telemetry collector 706 may also obtain energy data 812 from energy data sources 810. By way of example, energy data sources 810 may include, but are not limited to, services such as Electricity Maps, re.alto, FlatPeak, or the like, that provide energy data 812 (e.g., via various APIs, etc.). In general, energy data 812 may indicate information such as, but not limited to, the energy consumption by the various locations of physical network 820, energy costs, energy demand and supply information, and the like.

Telemetry collector 706 may further obtain QoE telemetry 830 from application experience data sources 840 that is indicative of the experience of an end user, such as end user 836 of the network. For instance, application experience data sources 840 may include services such as ThousandEyes, Nexthink, Aternity, 1E Solutions, Lakeside, or other services that are able to capture digital employee experience (DEX) information that can be included in QoE telemetry 830.

According to various embodiments, network optimization process 248 may represent physical network 820 as a digital twin using the information collected by telemetry collector 706. To this end, network optimization process 248 may rely on two primary building blocks: an ontology 806, stored in a relational database such as EdgeDB or PostgreSQL, and metrics 808, stored in a time-series database such as QuestDB. Generally, ontology 806 maps every network device, user, applications, and flows in physical network 820 to a digital equivalent, stored in database. Meanwhile, metrics 808 may store quantitative, time-varying data corresponding to each entity of ontology 806.

For instance, ontology 806 may represent a router as an entry in a Device table of its underlying database. Each interface of the router is represented in the Interface table, and a relation between them is defined. An application flow originating from a user's laptop, such as end user 836, to an application server in the cloud may be represented in a TrafficFlow table, with relations to both the laptop's and server's entries in an Endpoint table of the database.

A plurality of metrics in metrics 808 may be associated with each such entity in ontology 806. For instance, metrics bytes_per_sec and packets_per_sec can be associated with every entry in the TrafficFlow table. Metrics joule_per_bytes (i.e., traffic-dependent energy consumption) or baseline power (i.e., baseline energy consumption, even in absence of traffic) can be associated with an interface, a chip, a blade, or an entire device. Physical entities such as routers, switches, and servers may associated with Location entries, for which metrics such as usd_per_watthour and kg_co2_eq_per_watthour, which denote the price in USD per watt hour and the kilograms of Carbon Dioxide ($CO_2$) equivalent of greenhouse gas (GHG) emissions for 1 watt hour, which may be included in energy data 812 from energy data sources 810, which may provide electricity cost and carbon footprint per location across the world. Similarly, metrics 808 may also relate QoE telemetry 830 and/or network telemetry 814 with their corresponding entities in ontology 806.

In various embodiments, digital twin engine 702 may be responsible for reading the data stored in ontology 806 and metrics 808, to perform any or all of the following tasks:

1. Infer missing data: for instance, this may be the case of joule_per_bytes and baseline_power for device components (e.g., interfaces, chipsets, etc.) for which direct power consumption readings are not available. In this case, digital twin engine 702 may make use of an energy profiling module 822 (e.g., a subcomponent of digital twin engine 702) that is configured to estimate the value of joule_per_bytes or baseline_power. Energy profiling module 822 is described in greater detail below.

2. Forecast data: another capability of GreenNetAI cloud 802 is its ability to proactively power on or off some network devices and infrastructure in physical network 820, based on the estimated energy cost, demand, and supply. To this end, digital twin engine 702 may also rely on another subcomponent of it: energy and demand forecasting engine 824.

3. Simulate what-if scenarios: to ensure that any actions taken by GreenNetAI cloud 802 do not inadvertently cause undesired effects, digital twin engine 702 may also leverage a what-if engine subcomponent (not shown) to assess the outcome of a given action, both in terms of the resulting power consumption or carbon footprint, but also in terms of the impact on the end user experience. To do so, digital twin engine 702 must be able to simulate an alternate view of physical network 820 wherein one or more changes have been applied, and infer key metrics of interest (e.g., energy consumption, traffic load, etc.).

In various implementations, elastic topology manager 704 may be responsible for minimizing the energy consumption of physical network 820 (e.g., in terms of GHG emissions, energy costs, power or energy consumption, etc.), given a set of operational constraints, such as maintaining user experience metrics (UEM) above a given threshold for different applications, or limiting the risk of connectivity failure in different scenarios (single/double link/node failures). To this end, elastic topology manager 704 may rely on a subcomponent, policy engine 832, which is responsible for maintaining a set of allowed and disallowed actions 842, based on these constraints. Indeed, depending on the number of users in physical network 820, the types of applications they use, etc., different requirements may be inferred and used to formulate policies for policy engine 832. For instance, banks and hospitals may have very strict operational requirements at the expense of additional energy consumption, whereas retail, entertainment, or smaller businesses may be more flexible in terms of their operational requirements, allowing for even greater reductions in the energy consumption of physical network 820. Policy engine 832 may also provide some visibility as to the constraints during any what-if assessments of potential actions 842.

In various embodiments, elastic topology manager 704 may proceed as follows:

1. Query digital twin engine 702 for the current state of physical network 820, based on its digital twin.

2. Identify saving opportunities (e.g., redundant paths, over-provisioned devices, movable or deferrable workloads) and produce an estimated saving.

3. Simulate the changes using digital twin engine 702 and validate that they remain within operational constraints maintained by policy engine 832 (e.g., link loads below 80%, single-link failure protection).

4. Generate recommendations and or apply the change via an automation gateway 826.

The list of actions 842 triggered elastic topology manager 704 to reduce energy consumption while preserving QoE/DEX can be quite varied. For instance, set of allowed and disallowed actions 842 may include, but are not limited to, the computation of a sub-network for physical network 820, the performance of traffic classification and discrimination in physical network 820, to mention a few.

Automation gateway 826 then translates these changes into API queries to the various controllers. In some instance, automation gateway 826 provides a multi-controller, multivendor abstraction over the underlying network controllers 816. Because not all actions 842 may be supported by them, automation gateway 826 may also support a "dry run" mode, which allows elastic topology manager 704 to test whether the changes are possible and adjust the plan, accordingly. In various implementations, automation gateway 826 may be activated by a user or via an automation engine in charge of triggering changes after various verifications.

Here, the optimization of physical network 820 does not involve simply reducing its energy consumption at all cost, but doing so such that the QoE/DEX remains at an acceptable level. To this end, elastic topology manager 704 may also take into account QoE telemetry 830 from application experience data sources 840, to assess the impact of changes made in the past. If any adverse effect is noticed, it may revert the changes and adjust any corresponding operational constraints, accordingly. To do so, energy profiling module 822 may also specify which QoE/DEX metrics should be monitored to reflect the user experience in physical network 820.

Should the QoE/DEX become unsatisfactory (e.g., the required SLA for an application is no longer satisfied), elastic topology manager 704 may also undo any of its implemented actions 842, so as to reverse physical network 820 to its previous network state. In such a case, digital twin engine 702 and elastic topology manager 704 may also adjust their algorithms using detailed information about the stored states of 820 before and after triggering the changes along with the noticed impact on the QoE/DEX. Elastic topology manager 704 may then use this negative information to refine its energy saving optimization and corresponding model(s).

As shown in FIGS. 7-8, network optimization process 248 may also include an interface module 708 that allows interested users such as network owner 834 and/or end user 836 to monitor the on-going status of GreenNetAI cloud 802 and its underlying physical network 820. To this end, interface module 708 may provide a user interface and/or API that allow such a user to:

Visualize the saving opportunities that were captured, and those that were not, either due to limitations of the network (e.g., unsupported actions) or due to operational constraints (e.g., double-link failure protection). These opportunities may be mapped onto the different areas of the network and can be explored either in a table (e.g., ordered by saving magnitude, in USD or kg of Co2-eq) or using a topology visualization.

Provide feedback to the system about potential impacts to the user experience. This can be then used to adjust the operational constraints automatically and/or to improve the internal models used by elastic topology manager 704 to infer the impact of the changes.

——Policy Management and Enforcement in a Green Elastic Network——

As would be appreciated, it is imperative for any green elastic network, such as GreenNetAI cloud 802, to not only reduce energy consumption in its underlying network, but to also ensure that any actions taken to reduce energy consumption do not decrease the performance of the network below an acceptable level. However, doing so at scale can be quite challenging. To this end, the techniques herein further introduce a policy engine that allows a network administrator to explicitly configure a set of objectives (e.g., energy saving, cost) while enforcing hard/soft constraints (e.g., acceptable SLA degradation), per application, and under specific conditions (e.g., network state, etc.), in light of energy savings. The engine may also be capable of proposing policy templates after auditing the system/network.

Figure 9:
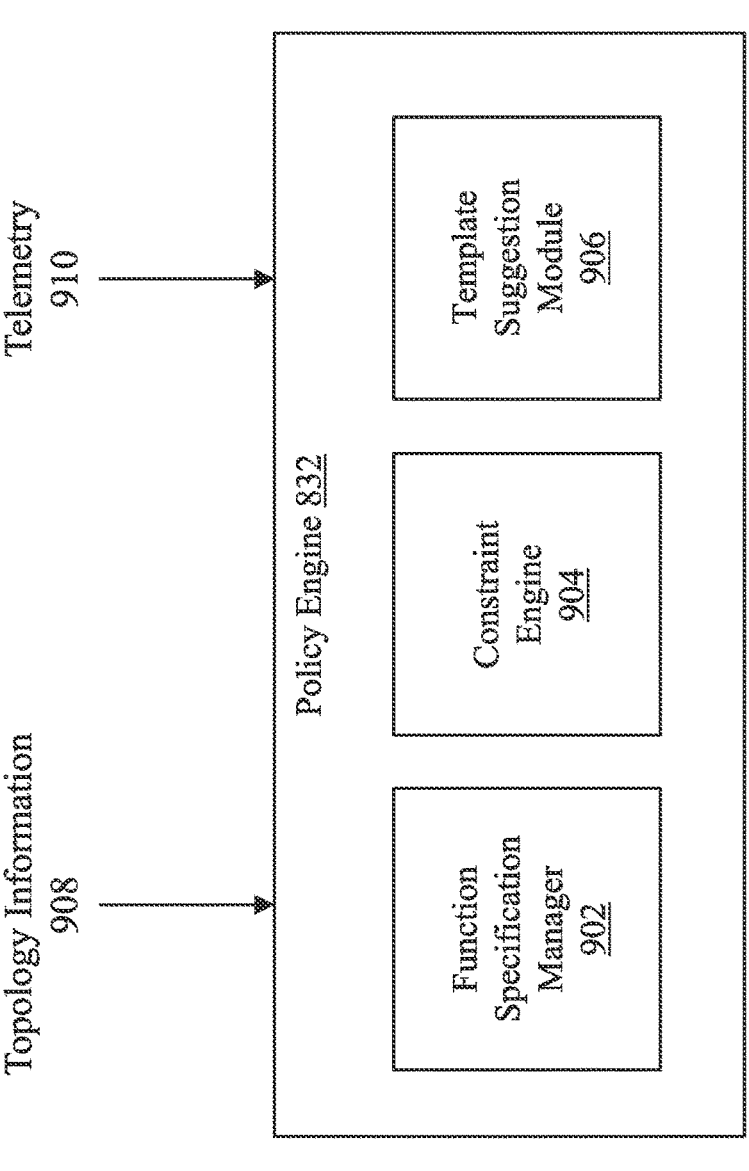
FIG. 9 illustrates an example architecture for policy management and enforcement in a green elastic network.

FIG. 9 illustrates an example architecture 900 for policy management and enforcement in a green elastic network. Continuing the example above of GreenNetAI cloud 802, one potential component of elastic topology manager 704 is policy engine 832, which is at the core of architecture 900. As shown, policy engine 832 may include any or all of the following sub-components: a function specification manager 902, a constraint engine 904, and/or a template suggestion module 906. As would be appreciated, these sub-components may be combined or omitted, as desired. In addition, in cases in which these sub-components are executed in a distributed manner, the executing devices can be seen as a singular device for purposes of the teachings herein. For instance, any or all of policy engine 832 may be hosted in the cloud or on prem, as desired.

During its operation, policy engine 832 may obtain topology information 908 from any number of sources. In some instances, policy engine 832 may obtain such information from telemetry collector 706 described previously. In further implementations, though, policy engine 832 may obtain topology information 908 by interconnecting with network controllers 816 (e.g., DNAC, vManage for SD-WAN, Intersight, FSO fabric, etc.) thanks to the use of APIs. In another embodiment, policy engine 832 may directly access physical network 820 by running a routing adjacency, should the IGP be a link state routing protocol such a OPSF or ISIS. In another embodiment, the network topology could be discovered using other routing adjacencies with a plurality of routers in different domains. In yet another embodiment, policy engine 832 may retrieve network information indicative of topology information 908 (e.g., configuration, resource information) using protocols such as SNMP, Netconf, NetFlow, Router/switches API and gRPC, Syslog. Generally, topology information 908 may provide information about the entities in physical network 820, their interconnections, and states.

Policy engine 832 may also obtain telemetry 910, such as network performance and usage telemetry regarding physical network 820. For instance, telemetry 910 may take the form of NetFlow records, various statistics collected via SNMP, advanced analytics provided by controllers such as vAnalytics, ThousandEyes, or the FSO platform, to only mention a few. Similar to topology information 908, policy engine 832 may obtain telemetry 910 from telemetry collector 706 or from network controllers 816 via APIs.

In various instances, as detailed below, policy engine 832 may also interact with interface module 708, to provide a dashboard to an administrator, such as network owner 834. This dashboard may allow them to configure policies and perform other administrative actions, as described herein.

Function specification manager 902 may be configured to determine an objective function that GreenNetAI cloud 802 should use to determine whether a given action should be implemented in physical network 820 or not. In a simple embodiment, policy engine 832 may be configured with an objective function to perform energy saving, i.e., reduce the amount of energy used by the set of networking resources, while satisfying the set of constraints specified via constraint engine 904. Another objective, though, might be to reduce the carbon footprint should the overall system have access to the carbon footprint of the various sources of energy used by the system. In yet another embodiment, GreenNetAI cloud 802 may be designed to reduce the overall cost of operation, according to the dynamic pricing portal feed, when available. Function specification manager 902 may determine the specific objective function based on the constraints specified by an administrator of the network via constraint engine 904.

In various implementations, constraint engine 904 may be configured to allow an administrator to specify constraints (e.g., via interface module 708) from which function specification manager 902 constructs its objective function. For instance, constraint engine 904 may support any or all of the following types of constraints:

1. Hard constraints: these are constraints that must be enforced when a specific set of conditions are met (as described below):

DEX/QoE—Generally, these types of constraints place constraints on the system with respect to the user application experience. For example, voice quality is usually evaluated using the Mean Opinionated Score (MOS). For some applications, these constraints may refer to various (proprietary) metrics (usually a scalar between 0 and 10) whereas, for other applications, it may be possible to refer to a percentage of time spent where various metrics are within specific SLA templates (e.g., delay<D, loss<L, etc.), in which case the QoE may be a number between 0 and 100 reflecting the percentage of time the SLA template is within (acceptable) range. In yet another situation, these constraints may be categorical in nature (e.g., Good, Degraded, Bad) such as with the labels received from Microsoft 365 in the context of the SD-WAN product family. Constraint engine 904 may support the configuration of all types of QoE-related metrics, per-application, and potentially according to a schedule, as well. For example, a hard constraint may be for the MOS score to be above a given value x only during office hours whereas outside of working hours the system may tolerate some degradation of QoE.

In addition to QoE and SLA-based constraints, a network administrator may also specify hard constraints that exclude certain groups of devices or sites from the energy-saving policies. Indeed, it may be perfectly acceptable to downscale network resources for retail spaces outside of working hours while, at the same time, a network administrator may be averse to implementing any energy-saving measures on critical sites such as manufacturing plants. Being able to define different levels of acceptable QoE/SLA or exclude certain devices or sites based on network or business functions is quite important, in many cases.

Conditions: in yet another embodiment, constraint engine 904 may also allow an administrator to specify whether hard constraints should be enforced under specific conditions. For example, policy engine 832 may enforce hard constraints during specific schedules, as discussed above, but also according to the state of physical network 820. Indeed, networks are dynamic and subject to failures (e.g., routers, switches, links, etc.). It may be desirable to only enforce hard constraint when the network is fully operational and not when specific set of resources are not available. Consider the case of a link failure between two sites. In such a case, the network topology will be adjusted, and the administrator may request that policy engine 832 stop enforcing hard constraints during the failure. For example, degraded SLA may be acceptable (then softening the hard constrained above) when network resources are no longer available potentially for a period of time (say few hours, during specific schedule).

The network administrator may want to request energy saving while allowing for some SLA degradation when network resources are no longer available as long as it does not exceed a specific period of time. To that end, policy engine 832 may also provide event notifications in case an administrator configures specific conditions via constraint engine 904. Policy engine 832 may also register with other systems to be notified of a specific event. For the sake of illustration, policy engine 832 may be notified if the network topology changes, in order to switch to a different policy as configured above. Another example may be if the policy specifies a "load condition" that must be met for the policy to be enforced. For example, the network administrator may specify a maximum number of Wi-Fi users in a site for a specific policy to be enforced: if, for some reasons, the maximum number of Wi-Fi users exceeds the pre-configured value, policy engine 832 may stop enforcing the policy, switching back to a state leading to less energy savings). Note that each time a condition is specified, policy engine 832 must be able to check the conditions either using a pull or push strategy (i.e., to be notified of an event by another engine or check by itself thanks to the polling of state conditions).

2. Soft constraints: in contrast with hard constraints, soft constraints are constraints that the system should try to satisfy without enforcing. The same set of constraints as specified for hard constraints could be specified as soft constraints, in some implementations.

In yet another embodiment, policy engine 832 may enforce hard or soft constraints in light of the potential energy savings. For instance, the network administrator may find SLA degradation acceptable for a given application A, if and only if the energy savings are at least of x % or y$. For example, the policy may specify that 20% of energy savings can justify the degradation of the SLA for some (less critical) application(s), but not during business hours.

Note that the policy could also allow for hard/soft constraints per application and according to the configured set of objective functions.

In yet another embodiment, policy engine 832 may allow for specifying whether the new network state after enforcing a given policy should be tolerant to failures without significant SLA degradation. In most IP/MPLS networks, Traffic Engineering (TE) is used to compute a topology that can handle a given traffic demand. The TE engine may also take into account additional constraints (Off-line IGP TE or PCE)

such as single or even double failures. Most networks are designed in order to handle traffic should a single network element fail (Link, shared risk link group, or node) in the network without significant SLA degradation. Double failures may even be supported in the case of highly redundant networks. MPLS TE Fast Reroute Bandwidth Protection even supports the provisioning of next-next-hop (NNHOP) Backup tunnel with bandwidth protection during reroute. To this end, policy engine 832 may also allow an administrator to specify a policy whereby the downscaling the network to save energy leads to a new state that can provide SLA preservation in case of single/multi-failure of network elements such as the link, shared risk link group, and node.

In various implementations, template suggestion module 906 may be configured to generate a suggested policy template for an administrator, after auditing the system. Since policy engine 832 has access to the network state, traffic demand and systems capable of SLA monitoring, a key functionality of policy engine 832 is to auto-generate policies that would lead to energy savings according to the set of constraints specified above using optimization techniques that are outside of the scope of the present invention. For example, policy engine 832 may suggest a policy allowing for some energy saving of x % during specific periods of time suggesting a set of resources to be taken away while at the same time guaranteeing SLA (according to the acceptable constraints specified by the user). Such a policy would then be reviewed by the user and potentially be activated.

Figure 10:
FIG. 10 illustrates an example simplified procedure for policy management and enforcement in a green elastic network.

FIG. 10 illustrates an example simplified procedure (e.g., a method) for policy management and enforcement in a green elastic network, in accordance with one or more implementations described herein. For example, a non-generic, specifically configured device (e.g., device 200), such as a router, firewall, controller for a network (e.g., an SDN controller or other device in communication therewith, s cloud controller, etc.), server, or the like, may perform procedure 1000 by executing stored instructions (e.g., network optimization process 248). In some instances, a set of distributed, specifically configured devices may also perform procedure 1000, in which case the set of devices can themselves be viewed as a singular device for purposes of the teachings herein. The procedure 1000 may start at step 1005, and continues to step 1010, where, as described in greater detail above, the device may receive one or more constraints from a user interface regarding an acceptable level of performance of a computer network. In some implementations, the one or more constraints specify a threshold level of network performance with respect to traffic for an application accessed via the computer network. In a further implementation, the one or more constraints restrict performance of the particular action in a designated portion of the computer network. In another implementation, the one or more constraints restrict performance of the particular action during a specified period of time. In a further implementation, the one or more constraints specify whether performance of a given action in the computer network should result in the computer network being resilient to a failure. In a further implementation, the device may also provide the one or more constraints as suggestions to the user interface (e.g., as part of a suggested template).

At step 1015, as detailed above, the device may form, based on the one or more constraints, a policy to control performance of actions in the computer network to reduce its energy consumption. In some cases, the one or more constraints are applicable when an amount of energy savings associated with a given action is below a defined threshold.

in further cases, the one or more constraints are applicable based on whether there is a failure occurring in the computer network.

At step 1020, the device may determine whether a particular action to reduce energy consumption by the computer network would violate the policy, as described in greater detail above. In some implementations, the one or more constraints are soft constraints that the policy does not enforce and the device uses to select the particular action.

At step 1025, as detailed above, the device may cause performance of the particular action in the computer network, when doing so does not violate the policy. For instance, in some cases, the particular action comprises shutting down an interface on a switch in the computer network or routing traffic in the computer network via a different path.

Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce approaches for policy management and enforcement in green elastic networks designed to reduce energy consumption while maintaining DEX/QoE, according to specific constraints and objectives. This approach to maintaining DEX/QoE leverages digital twins, various models (e.g., for energy consumption, etc.), network state retrievals, and/or the monitoring of network QoE and SLA metrics in the form of positive/negative feedback.

According to various embodiments, a method is introduced herein comprising receiving, at a device, one or more constraints from a user interface regarding an acceptable level of performance of a computer network. The method may also comprise forming, by the device and based on the one or more constraints, a policy to control performance of actions in the computer network to reduce its energy consumption. The method may further comprise determining, by the device, whether a particular action to reduce energy consumption by the computer network would violate the policy. The method may additionally comprise causing, by the device, performance of the particular action in the computer network, when doing so does not violate the policy.

In some embodiments, the one or more constraints specify a threshold level of network performance with respect to traffic for an application accessed via the computer network. In another embodiment, the one or more constraints restrict performance of the particular action in a designated portion of the computer network. In another embodiment, the one or more constraints restrict performance of the particular action during a specified period of time. In a further embodiment, the one or more constraints are applicable when an amount of energy savings associated with a given action is below a defined threshold. In some embodiments, the one or more constraints are applicable based on whether there is a failure occurring in the computer network. In another embodiment, the one or more constraints are soft constraints that the policy does not enforce and the device uses to select the particular action. In some embodiments, the one or more constraints specify whether performance of a given action in the computer network should result in the computer network being resilient to a failure. In one embodiment, the method further comprises providing, by the device, the one or more constraints as suggestions to the user interface. In yet another embodiment, the particular action comprises shutting down an interface on a switch in the computer network or routing traffic in the computer network via a different path.

Further, according to the embodiments herein an apparatus herein may comprise: one or more network interfaces to communicate with a network; a processor coupled to the one or more network interfaces and configured to execute one or more processes; and a memory configured to store a process executable by the processor, the process, when executed, configured to receive one or more constraints from a user interface regarding an acceptable level of performance of a computer network. The process when executed is also configured to form, based on the one or more constraints, a policy to control performance of actions in the computer network to reduce its energy consumption. When executed, the process is further configured to determine whether a particular action to reduce energy consumption by the computer network would violate the policy. The process when executed is additionally configured to cause performance of the particular action in the computer network, when doing so does not violate the policy.

According to the embodiments herein, a tangible, non-transitory, computer-readable medium herein may have program instructions stored thereon that, when executed by a device, may cause the computer to perform a method comprising receiving, at the device, one or more constraints from a user interface regarding an acceptable level of performance of a computer network. The method may also comprise forming, by the device and based on the one or more constraints, a policy to control performance of actions in the computer network to reduce its energy consumption. The method may further comprise determining, by the device, whether a particular action to reduce energy consumption by the computer network would violate the policy. The method may additionally comprise causing, by the device, performance of the particular action in the computer network, when doing so does not violate the policy.

While there have been shown and described illustrative implementations that provide for policy management and enforcement in a green elastic network, it is to be understood that various other adaptations and modifications may be made within the spirit and scope of the implementations herein. For example, while certain network adaptations are described herein with respect to achieving reduced resource consumption, examples are not limited as such and may involve other modifications, in other implementations. Likewise, a wide variety of resource consumption metrics may be targeted for minimization alongside or instead of those describe herein. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

receiving, at a device, one or more constraints from a user interface regarding an acceptable level of performance of a computer network;

forming, by the device and based on the one or more constraints, a policy to control performance of actions in the computer network to reduce its energy consumption;

determining, by the device, whether a particular action to reduce energy consumption by the computer network would violate the policy by:

identifying one or more saving opportunities of a current state of the computer network, determining the particular action based on the one or more saving opportunities, predicting a post-action state of the computer network by simulating the computer network with the particular action performed, and determining whether the post-action state of the computer network indicates performance of the particular action would violate the policy; and causing, by the device, performance of the particular action in the computer network, when doing so does not violate the policy.

2. The method as in claim 1, wherein the one or more constraints specify a threshold level of network performance with respect to traffic for an application accessed via the computer network.

3. The method as in claim 1, wherein the one or more constraints restrict performance of the particular action in a designated portion of the computer network.

4. The method as in claim 1, wherein the one or more constraints restrict performance of the particular action during a specified period of time.

5. The method as in claim 1, wherein the one or more constraints are applicable when an amount of energy savings associated with a given action is below a defined threshold.

6. The method as in claim 1, wherein the one or more constraints are applicable based on whether there is a failure occurring in the computer network.

7. The method as in claim 1, wherein the one or more constraints are not enforced by the policy and the device uses the one or more constraints to select the particular action.

8. The method as in claim 1, wherein the one or more constraints specify whether performance of a given action in the computer network should result in the computer network being resilient to a failure.

9. The method as in claim 1, further comprising:

providing, by the device, the one or more constraints as suggestions to the user interface.

10. The method as in claim 1, wherein the particular action comprises shutting down an interface on a switch in the computer network or routing traffic in the computer network via a different path.

11. An apparatus, comprising:

one or more network interfaces;

a processor coupled to the one or more network interfaces and configured to execute one or more processes; and a memory configured to store a process that is executable by the processor, the process when executed configured to:

receive one or more constraints from a user interface regarding an acceptable level of performance of a computer network;

form, based on the one or more constraints, a policy to control performance of actions in the computer network to reduce its energy consumption;

determine whether a particular action to reduce energy consumption by the computer network would violate the policy by:

identifying one or more saving opportunities of a current state of the computer network, determining the particular action based on the one or more saving opportunities, predicting a post-action state of the computer network by simulating the computer network with the particular action performed, and determining whether the post-action state of the computer network indicates performance of the particular action would violate the policy; and cause performance of the particular action in the computer network, when doing so does not violate the policy.

12. The apparatus as in claim 11, wherein the one or more constraints specify a threshold level of network performance with respect to traffic for an application accessed via the computer network.

13. The apparatus as in claim 11, wherein the one or more constraints restrict performance of the particular action in a designated portion of the computer network.

14. The apparatus as in claim 11, wherein the one or more constraints restrict performance of the particular action during a specified period of time.

15. The apparatus as in claim 11, wherein the one or more constraints are applicable when an amount of energy savings associated with a given action is below a defined threshold.

16. The apparatus as in claim 11, wherein the one or more constraints are applicable based on whether there is a failure occurring in the computer network.

17. The apparatus as in claim 11, wherein the one or more constraints are not enforced by the policy and the apparatus uses the one or more constraints to select the particular action.

18. The apparatus as in claim 11, wherein the one or more constraints specify whether performance of a given action in the computer network should result in the computer network being resilient to a failure.

19. The apparatus as in claim 11, wherein the process when executed is further configured to:

provide the one or more constraints as suggestions to the user interface.

20. A tangible, non-transitory, computer-readable medium storing program instructions that cause a device to execute a process comprising:

receiving, at the device, one or more constraints from a user interface regarding an acceptable level of performance of a computer network;

forming, by the device and based on the one or more constraints, a policy to control performance of actions in the computer network to reduce its energy consumption;

determining, by the device, whether a particular action to reduce energy consumption by the computer network would violate the policy by:

identifying one or more saving opportunities of a current state of the computer network, determining the particular action based on the one or more saving opportunities,

predicting a post-action state of the computer network by simulating the computer network with the particular action performed, and determining whether the post-action state of the computer network indicates performance of the particular action would violate the policy; and causing, by the device, performance of the particular action in the computer network, when doing so does not violate the policy.

* * * * *